(12) United States Patent
Sim et al.

(10) Patent No.: US 11,854,059 B2
(45) Date of Patent: Dec. 26, 2023

(54) SMART APPARATUS

(71) Applicant: LG ELECTRONICS INC., Seoul (KR)

(72) Inventors: Myoseop Sim, Seoul (KR); Dongki Cheon, Seoul (KR); Huijeong Seong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 590 days.

(21) Appl. No.: 16/796,873

(22) Filed: Feb. 20, 2020

(65) Prior Publication Data

US 2021/0174422 A1 Jun. 10, 2021

(30) Foreign Application Priority Data

Dec. 4, 2019 (KR) .......................... 10-2019-0159631

(51) Int. Cl.
| | |
|---|---|
| *G06Q 30/0601* | (2023.01) |
| *H04L 67/306* | (2022.01) |
| *G06N 3/08* | (2023.01) |
| *G06Q 30/0251* | (2023.01) |
| *G06Q 30/018* | (2023.01) |
| *G06Q 30/02* | (2023.01) |
| *G06Q 30/0201* | (2023.01) |

(52) U.S. Cl.
CPC .......... *G06Q 30/0631* (2013.01); *G06N 3/08* (2013.01); *G06Q 30/0185* (2013.01); *G06Q 30/02* (2013.01); *G06Q 30/0201* (2013.01); *G06Q 30/0269* (2013.01); *G06Q 30/0623* (2013.01); *H04L 67/306* (2013.01)

(58) Field of Classification Search
CPC .............. G06Q 30/0631; G06Q 30/02; G06Q 30/0269; G06Q 30/0185; G06Q 30/0201; G06Q 30/0623; G06Q 30/0641; G06N 3/08; H04L 67/306; H04L 63/102
See application file for complete search history.

(56) References Cited

U.S. PATENT DOCUMENTS

| | | | |
|---|---|---|---|
| 2010/0030578 A1* | 2/2010 | Siddique ................. | H04W 4/00 705/26.1 |
| 2013/0203433 A1* | 8/2013 | Luna ..................... | H04W 72/04 455/452.1 |
| 2016/0234624 A1* | 8/2016 | Riva ....................... | H04W 4/60 |
| 2019/0327330 A1* | 10/2019 | Natarajan ........... | H04L 43/0894 |
| 2021/0090156 A1* | 3/2021 | Deveaux ................ | H04W 4/80 |

OTHER PUBLICATIONS

Badidi et al., "A Conceptual Framework for Personalization of Mobile Cloud Services" (published in 2015 International Conference on Cloud Technologies and Applications (CloudTech), 2015, pp. 1-7 (Year: 2015).*

* cited by examiner

*Primary Examiner* — James M Detweiler
*Assistant Examiner* — Patrick Kim
(74) *Attorney, Agent, or Firm* — LEE, HONG, DEGERMAN, KANG & WAIMEY PC

(57) ABSTRACT

The present disclosure describes a smart apparatus, comprising: determining if an application is authorized to use a user profile, when the application installed on the smart apparatus requests the user profile; and transmitting the user profile to the server corresponding to the application when the application is determined to have a user right.

8 Claims, 13 Drawing Sheets

FIG. 15

| | P.M 4:51 |
|---|---|
| ← Analysis algorithm | |

1510 — Profile

| Worker ✓ | A child ✓ |
| A pet ✓ | A car ✓ |

1520 — Recommended productanalysis

| Water 500ML  2000won | ;worker; a car; |
| Latte 250ML  2000won | ;worker; |
| Meat 200G  7900won | ;worker; a child; |
| Coke 1500  1500won | ;worker; a car; |
| Almond 170G  5900won | ;worker; |
| Fish 1  4900won | ;worker; a child; |
| Steak  3800won | ;worker; |
| Noddle 360G  3400won | ;worker; |

US 11,854,059 B2

SMART APPARATUS

CROSS-REFERENCE TO RELATED APPLICATIONS

Pursuant to 35 U.S.C. § 119(a), this application claims the benefit of earlier filing date and right of priority to Korean Patent Application No. 10-2019-0159631, filed on Dec. 4, 2019, the contents of which are hereby incorporated by reference herein in its entirety.

BACKGROUND

The present disclosure describes an apparatus for generating a user profile, and recommending a product to a user based on the generated user profile and a recommended algorithm, with a method for recommending a customized product to the user.

The recommended algorithm is an algorithm of recommending what a subject will like. The recommended algorithm representatively used is collaborative filtering. The collaborative filtering, which is a likely mind, is made in a manner of recommending what other users having similar disposition to me like.

Meanwhile, the collaborative filtering cannot recommend a new product that the user does not inquire, and cannot perform a customized recommendation of an individual user because it makes a recommendation basically on the basis of popularity.

SUMMARY

The purpose of the present disclosure is to generate a user profile by using information of a smart apparatus, and recommend a customized recommendation of an individual user by using the generated user profile and a recommendation algorithm.

The present disclosure describes a smart apparatus comprising: a communication interface configured to communicate with a server; and one or more processors configured to: determine if an application is authorized to use a user profile, when the application installed on the smart apparatus requests the user profile; and transmit the user profile to the server corresponding to the application when the application is determined to have a user right, wherein the server is to recommend a product to the user based on the obtained user profile or recommended product information.

BRIEF DESCRIPTION OF THE DRAWINGS

FIG. 15 is an output example of the present disclosure.

DETAILED DESCRIPTION OF THE EMBODIMENTS

Figure 1:
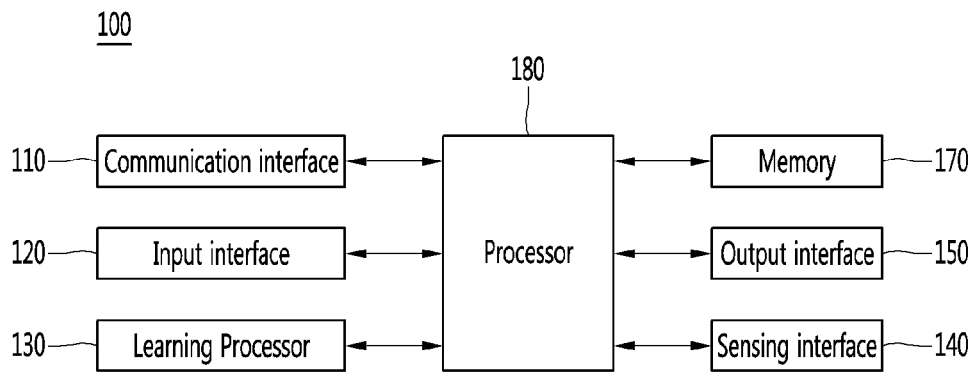
FIG. 1 is a block diagram illustrating an AI apparatus according to an embodiment of the present disclosure.

Hereinafter, details of the present invention will be described. An embodiment described below is only an example of the present invention, and the present invention can be deformed in various modes. Hence, specific configurations and functions disclosed below by no means limit the claims.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "interface" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving interface may include an actuator or a motor and may perform various physical operations such as moving a robot joint. In addition, a movable robot may include a wheel, a brake, a propeller, and the like in a driving interface, and may travel on the ground through the driving interface or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present disclosure.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication interface 110, an input interface 120, a learning processor 130, a sensing interface 140, an output interface 150, a memory 170, and a processor 180.

The communication interface 110 may transmit and receive data to and from external devices such as other 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

Here, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a training data for model learning and an input data to be used when an output is acquired by using learning model. The input interface 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing interface 140 may acquire at least one of internal information about the AI apparatus 100, ambient environment information about the AI apparatus 100, and user information by using various sensors.

Examples of the sensors included in the sensing interface 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

Here, the output interface 150 may include a display interface for outputting time information, a speaker for outputting auditory information, and a haptic module for outputting haptic information.

The memory 170 may store data that supports various functions of the AI apparatus 100. For example, the memory 170 may store input data acquired by the input interface 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
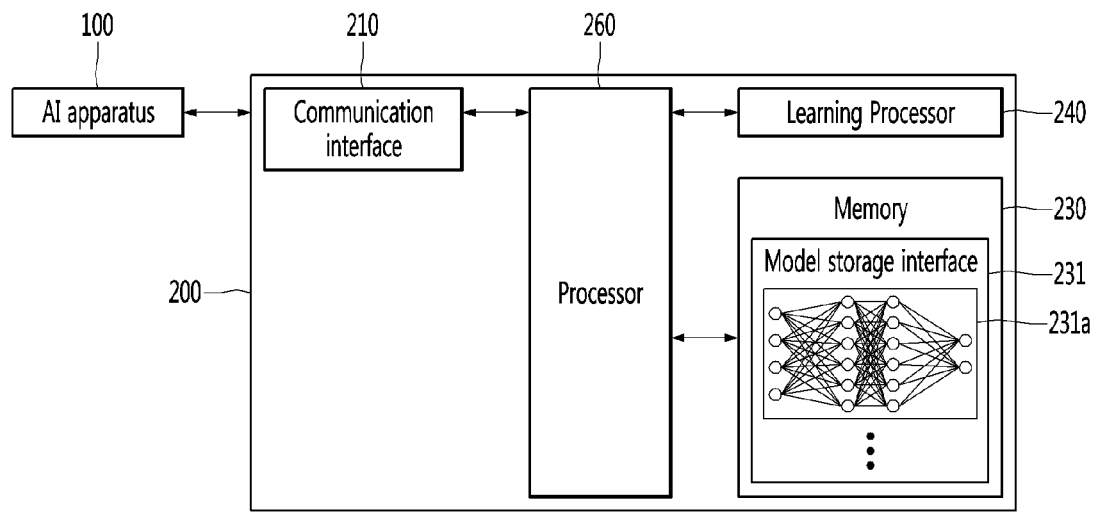
FIG. 2 is a block diagram illustrating an AI server according to an embodiment of the present disclosure.

FIG. 2 is a block diagram illustrating an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication interface 210, a memory 230, a learning processor 240, a processor 260, and the like.

The communication interface 210 can transmit and receive data to and from an external device such as the AI apparatus 100.

The memory 230 may include a model storage interface 231. The model storage interface 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
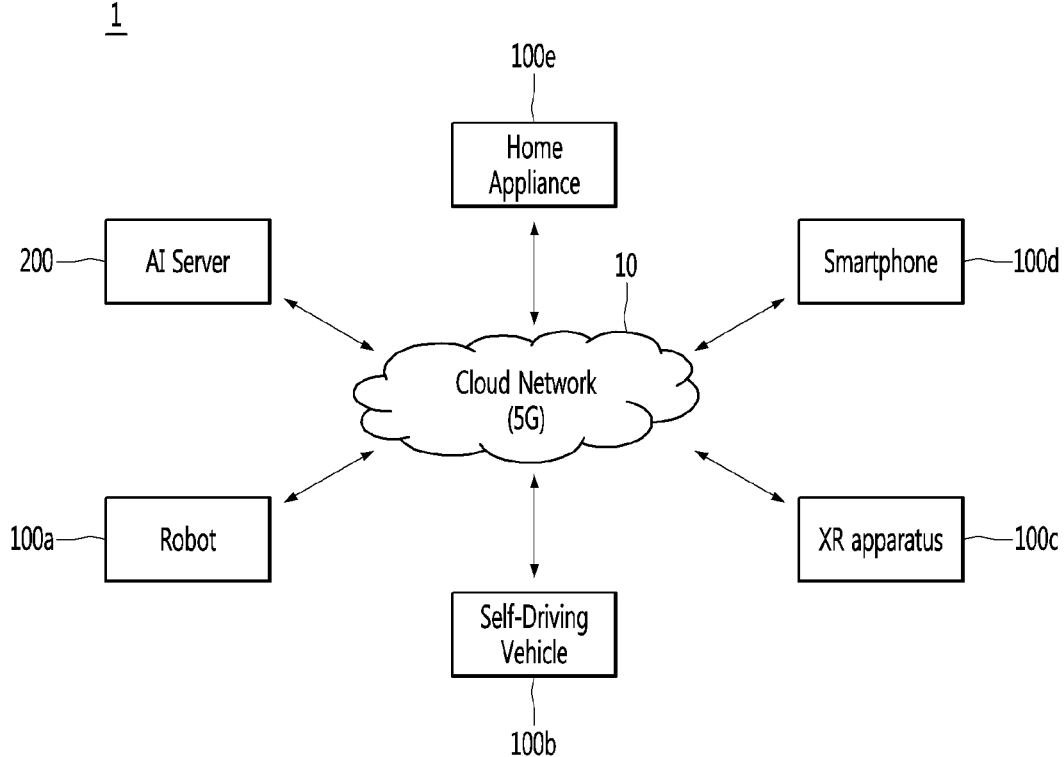
FIG. 3 is a view illustrating an AI system according to an embodiment of the present disclosure.

FIG. 3 is a view illustrating an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving interface such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving interface based on the control/interaction of the user. Here, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling route by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving interface such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving interface based on the control/interaction of the user. Here, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving interface of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include a HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
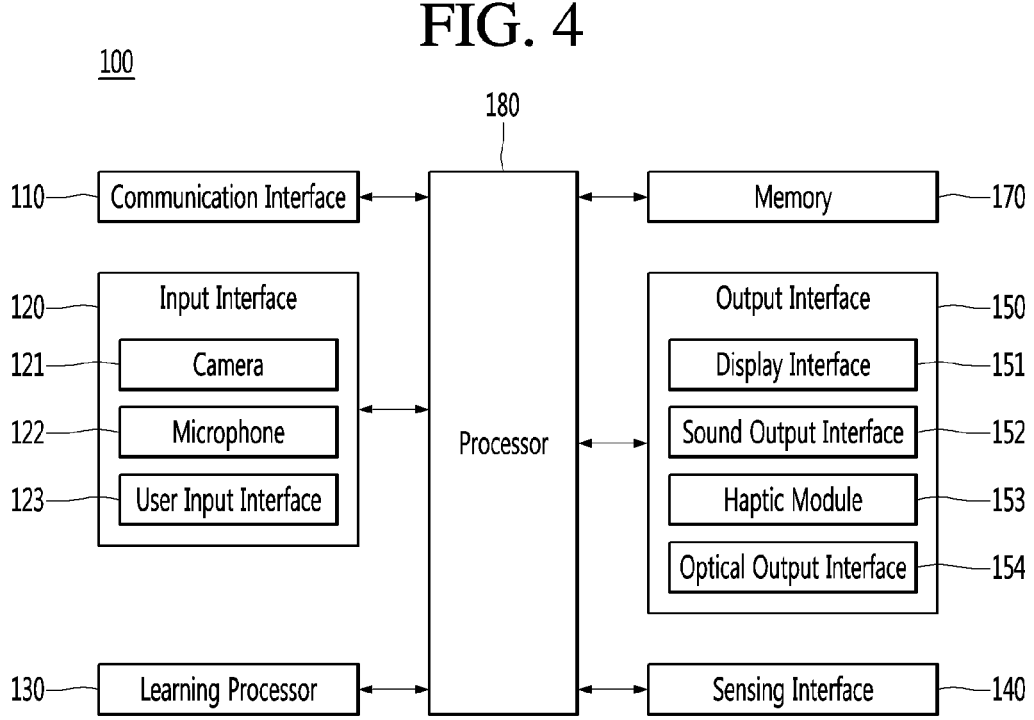
FIG. 4 is a block diagram illustrating an AI apparatus according to an embodiment of the present disclosure.

FIG. 4 is a block diagram illustrating an AI apparatus 100 according to an embodiment of the present disclosure.

The redundant repeat of FIG. 1 will be omitted below.

In the present disclosure, the AI apparatus 100 may include an edge device.

The communication interface 110 may also be referred to as a communicator.

Referring to FIG. 4, the input interface 120 may include a camera 121 for image signal input, a microphone 122 for receiving audio signal input, and a user input interface 123 for receiving information from a user.

Voice data or image data collected by the input interface 120 are analyzed and processed as a user's control command.

Then, the input interface 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display interface 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input interface 123 is to receive information from a user and when information is inputted through the user input interface 123, the processor 180 may control an operation of the AI apparatus 100 to correspond to the inputted information.

The user input interface 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensing interface 140 may also be referred to as a sensor interface.

The output interface 150 may include at least one of a display interface 151, a sound output module 152, a haptic module 153, or an optical output module 154.

The display interface 151 may display (output) information processed in the AI apparatus 100. For example, the display interface 151 may display execution screen information of an application program running on the AI apparatus 100 or user interface (UI) and graphic user interface (GUI) information according to such execution screen information.

The display interface 151 may be formed with a mutual layer structure with a touch sensor or formed integrally, so that a touch screen may be implemented. Such a touch screen may serve as the user input interface 123 providing an input interface between the AI apparatus 100 and a user, and an output interface between the AI apparatus 100 and a user at the same time.

The sound output module 152 may output audio data received from the wireless communication interface 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
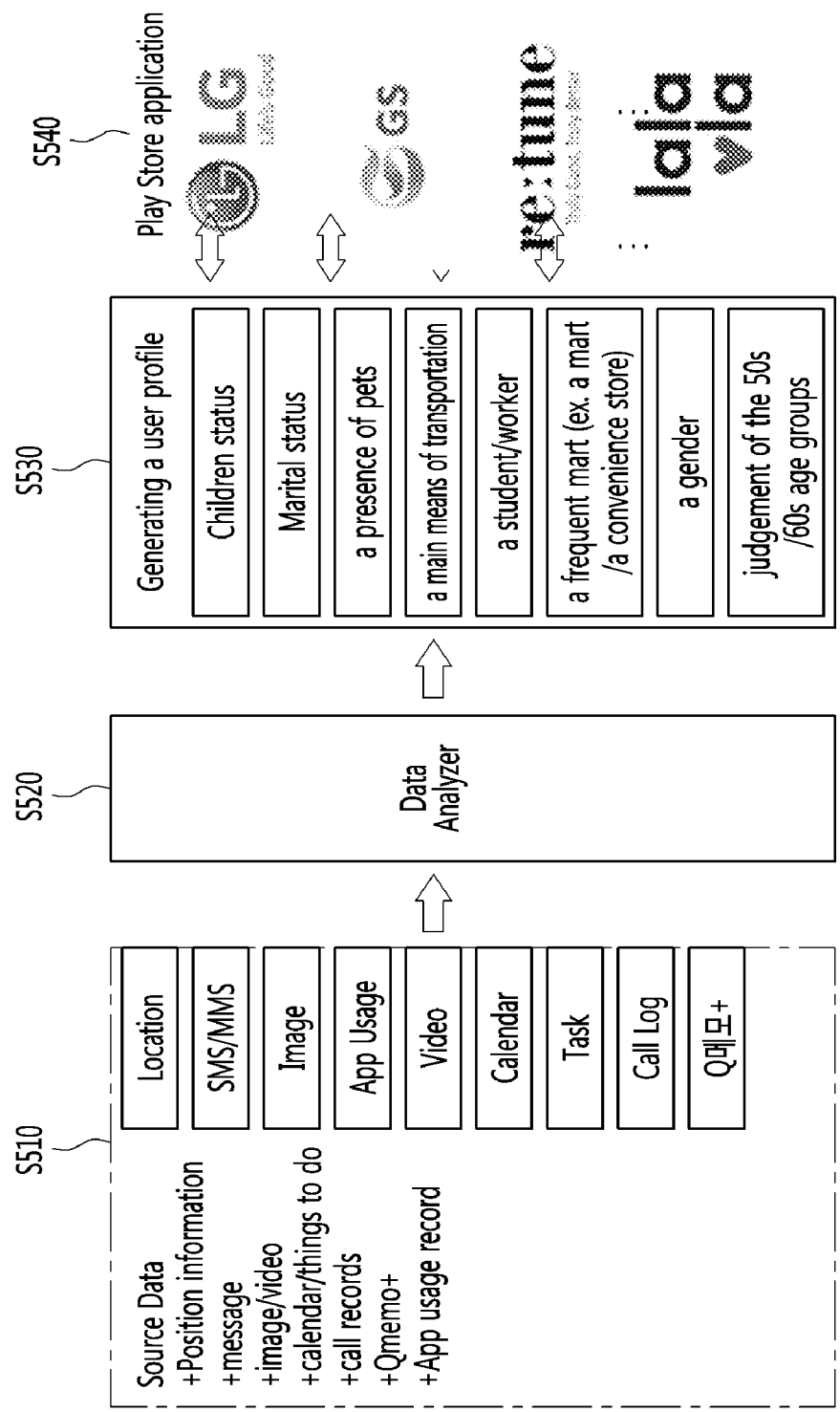
FIG. 5 illustrates a process of generating a user profile of the present disclosure.

FIG. 5 Illustrates a Process of Generating a User Profile of the Present Disclosure.

Ahead of explanation of the user profile, an intelligent service model for generating and utilizing the user profile may be implemented. The intelligent service model may include a collection engine, a categorization engine, and a service provider. The intelligent service model may be installed in an application shape and implemented through a processor 180, or may be implemented through a server and the like connected to a user terminal and the like.

The collection engine may collect source data relative to user information through a terminal that a user uses.

The categorization engine may cluster and categorize the source data obtained from the collection engine. At this time, the clustering may mean grouping data with similar objects. The categorization engine may generate the user profile by clustering the obtained source data.

The service provider may recommend a server appropriate for the user by using the user profile generated in the categorization engine.

Such an intelligent service model can directly analyze, select and provide a service necessary for the user without the user's request, unlike a conventional service providing scheme.

The collection engine and the categorization engine of the present disclosure are included in the processor 180 of a smart apparatus 100, or is implemented with software, and accordingly, the processor 180 can operations of the collection engine and the categorization engine.

In addition, an artificial intelligence (AI) apparatus 100 may be used in combination with the smart apparatus 100.

In addition, the service provider may include the smart apparatus 100 of the present disclosure or an outer server.

Hereinafter, in FIG. 5, the process of generating the user profile will be described.

Referring to FIG. 5, the processor 180 of the smart apparatus 100 can obtain source data included in the smart apparatus 100 or another terminal, which the user possesses (S510). At this time, the source data may mean data created by using the smart apparatus or another apparatus by the user.

For example, the source data may include position information, a message, an image and a video, calendar information, a call record, a memory, an app usage history or the like.

The processor 180 of the present disclosure may cluster the source data through a preset algorithm similar to the source data (S520).

For the clustering, the processor 180 of the present disclosure may generate a set of data having a category relative to a service to be provided to the user. In addition, the set of data for clustering may be obtained from a server operated by external companies. The categorization engine may generate the user profile by clustering the obtained source data.

The processor 180 according to the present disclosure may generate the user profile (S530). The user profile is information extracted based on the smart apparatus or another terminal which the user uses, and may include personal information of the user.

The generated user profile may include a status of children, a marital status, a presence of pets, a main means of transportation, a work status and the like.

According to the present disclosure, with a method for generating the user profile, the processor 180 may input the source data in an artificial neural network (ANN) model, and generate the user profile as a result value of the ANN model, and the source data may include application information installed in the smart apparatus, message information and contact address information.

The processor 180 according to the present disclosure may be transmitted to the outer server requesting the user profile. Herein, the outer server may mean a service provider, and may provide a service appropriate for the user based on the user profile (S540). In addition, the processor 180 according to the present disclosure may provide a user-customized service based on the user profile.

Hereinafter, in FIG. 6, the process for recommending a user-customized product will be described.

Figure 6:
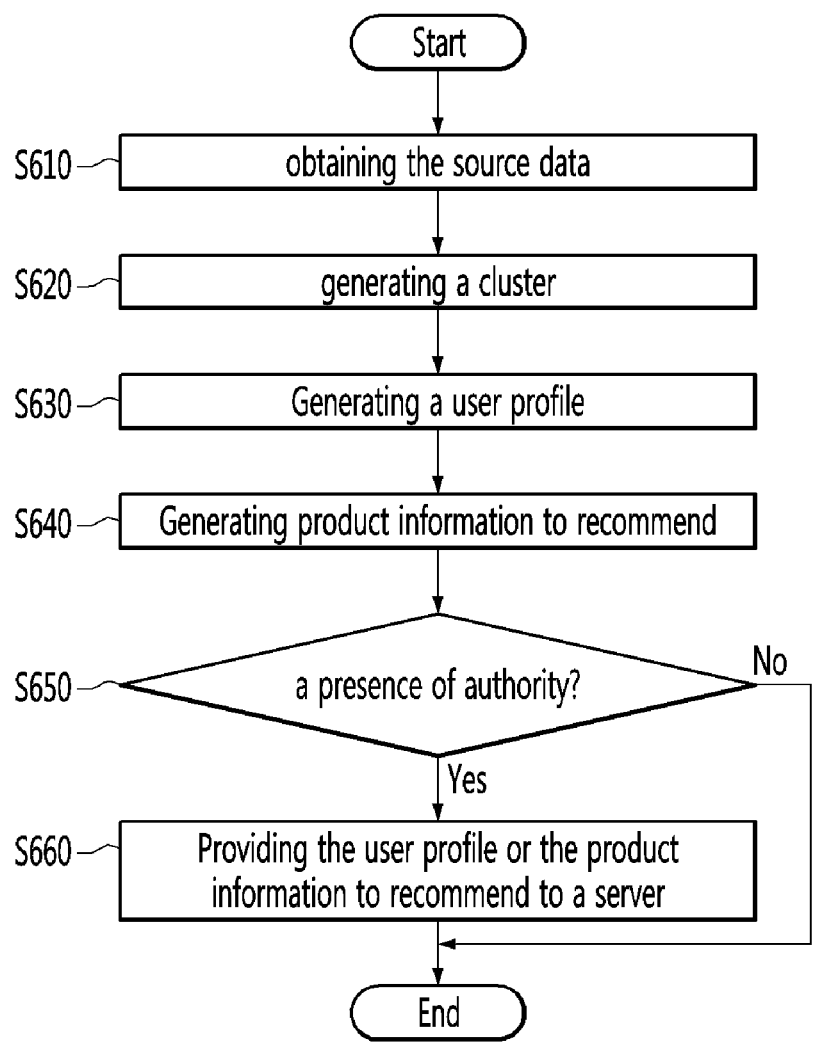
FIG. 6 is a flowchart of the present disclosure.

FIG. 6 is a Flowchart of the Present Disclosure.

FIG. 6 is a view for explaining an implementation of the user profile of the smart apparatus 100 of the present disclosure. A flowchart of FIG. 6 may be implemented in the intelligent service model.

Referring to FIG. 6, the processor 180 of the smart apparatus 100 may obtain the source data included in the smart apparatus 100 or another terminal of the user (S610). In addition, the processor 180 of the smart apparatus 100 may generate a cluster for generating the user profile (S620), and may generate the user profile based on a clustering result (S630). Steps S610 to S630 above may correspond to the process of FIG. 5.

The processor 180 of the smart apparatus 100 according to the present disclosure may generate the user profile, and generate product information to be recommended to the user of the smart apparatus 100 (S640).

In detail, the product information to recommend may include product information generated based on recommendation algorithm and the user profile. At this time, the recommendation algorithm may be implemented by (1) User-Based Collaborative Filtering (UBCF) which provides a customized recommendation by analyzing the user's behavioral data. The UBCF may include a manner of recommending a product included in a product history in which another user purchased by calculating similarity between users. The similarity between users may be calculated by constituting a matrix when there is user evaluation data. In addition, the recommendation algorithm may be implemented by (2) Item-based Collaborative Filtering (IBCF) showing a similar product when the user inquires a product by calculating similarity between products. In addition, (3) Content-based Filtering may also be included in the recommendation algorithm.

A communication interface 110 of the smart apparatus 100 according to the present disclosure may transmit the user profile to the outer server when the outer server requests the user profile, by communicating with the outer server. In addition, when an application installed in the smart apparatus 100 requests the user profile, the processor 180 may confirm if the application is authorized to access the user profile (S650).

The processor 180 may transmit the user profile to a server corresponding to the application, when the application the application is authorized to access the user profile (S660). In addition, the outer server that obtains the user profile may transmit the product recommendation information to the smart apparatus 100 based on the obtained user profile.

As another example, the communication interface 110 of the smart apparatus 100 according to the present disclosure may transmit recommended product information generated based on the user profile and the recommendation algorithm in the smart apparatus 100 by communicating with the outer server (S660).

Hereinafter, FIG. 7 will describe the process of determining if the application of S650 is authorized to access the user profile.

Figure 7:
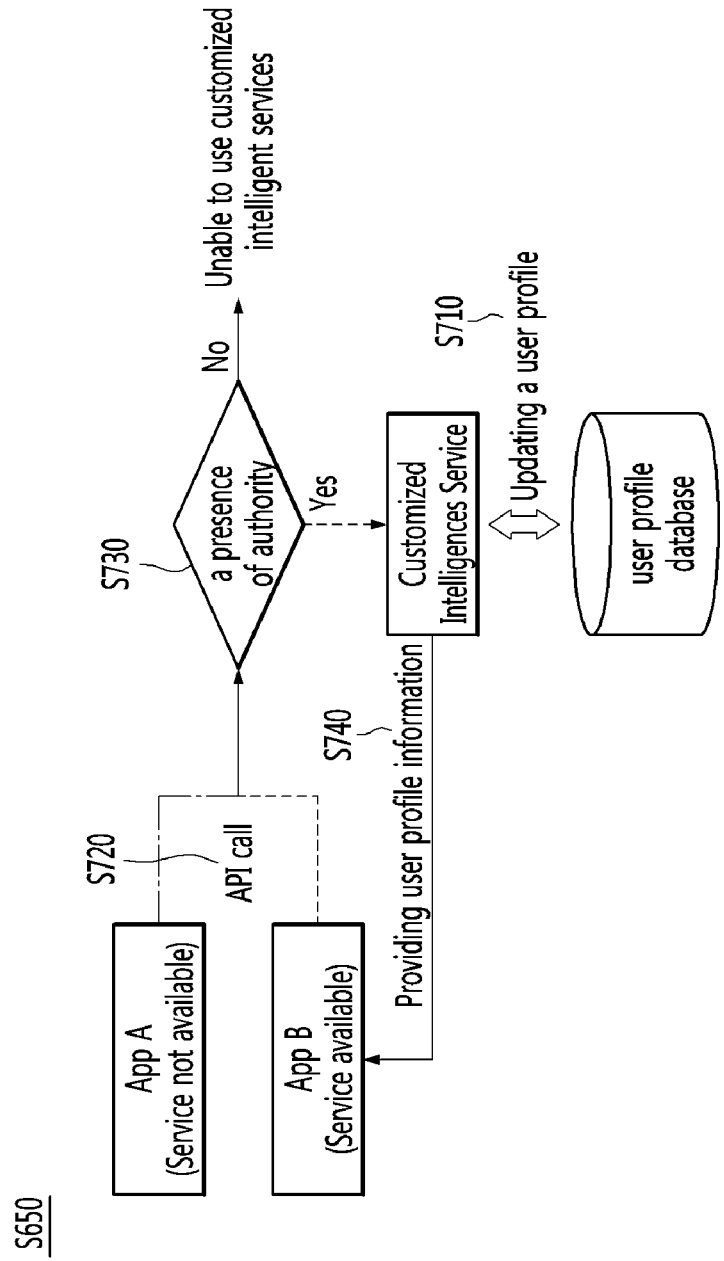
FIG. 7 is an embodiment of the present disclosure.

FIG. 7 is an Embodiment of the Present Disclosure.

Referring to FIG. 7, when the application installed in the smart apparatus 100 requests the user profile, the processor

180 may determine if the application is authorized to user the user profile, and may transmit the user profile to a server corresponding to the application, when the application has a user right. At this time, the server may be to recommend a product to the user based on the obtained user profile or recommended product information.

In addition, a plurality of applications are installed in the smart apparatus 100, and a right to use the user profile may be differently assigned to each of the plurality of applications.

For example, referring to FIG. 7, suppose that there are application A and application B. The smart apparatus 100 may generate the user profile for providing a customized intelligent service of an individual user. In addition, the generated user profile may be stored in a memory 170.

The processor 180 may store the generated user profile in the memory 170, and update the user profile according to a subsequent application installation or use of the smart apparatus 100 of the user (S710).

Suppose that the application A is an application not authorized to use the user profile, and the application B is an application authorized to use the user profile.

Servers corresponding to the applications A and B may call API of the smart apparatus 100 to provide the recommended product by using the user profile information (S720). When an application installed in the smart apparatus 100 requests the user profile, the processor 180 may determine if the application is authorized to use the user profile. For example, it may be determined that the application A is not authorized to use the user profile, and the application B is authorized to use the user profile (S730).

That is, the processor 180 may differently assign the right to use the user profile with regard to the application A and the application B, and may provide information only to an authorized application (S740).

According to the present disclosure, the user profile includes at least one information of a status of children, a marital status, a presence of pets, a car status or a work status. In addition, the processor 180 may select information to be provided to each of the plurality of applications from information included in the user profile, and provide the selected information to each of the plurality of application.

At this time, the selected information may be individually determined as per each of the plurality of applications based on the information included in each of the plurality of applications.

The information included in each of the plurality of applications includes a function, use and a category of the application.

For example, suppose that a first application is an application for house furniture shopping, and a second application is an application that purchases car supplies.

The processor 180 may determine if the first application and the second application are authorized to use the user profile.

When the first application and the second application are authorized to use the user profile, the processor 180 may acquire information for the function, the use and the category included in the first application.

The processor 180 may select profile information to be provided to the first application, in the user profile according the acquired information.

For example, when the processor 180 acquires information for house furniture shopping acquired from the first application, the processor 180 may select information for choosing furniture, such as a status of children, a marital status, an age group and a gender, from a plurality of information included in the user profile, and transmit the information to a server corresponding to the first application.

The processor 180 may select information such as the type of car, a main transportation means, a gender or an age group, as information for choosing the car supplies in a case of the second application, and transmit the information to a server corresponding to the second application.

Such a processor 180 may select information to be provided to each of a plurality of applications from information included in the user profile, and provide the selected information to each of the plurality of applications.

According to the present disclosure, the processor 180 may extract an application authorized to user the user profile, generate a list including the application and the selected information corresponding to the application, and store the generated list in the memory 170.

In detail, the processor 180 may generate a user profile list corresponding to each of the plurality of applications. The processor 180 may select the user profile to be provided to each of the plurality of applications installed in the smart apparatus 100, and provide minimum personal information by generating the list corresponding to the application and efficiently manage the provided information.

The server corresponding to each of the applications may transmit product information to be recommended to the user based on the obtained user profile.

As another example, suppose that the smart apparatus 100 communicates with the server corresponding to the plurality of applications.

The communication interface 110 of the smart apparatus 100 may communicate with a first server and a second server. The processor 180 of the smart apparatus 100 may receive product purchase history information purchased through the first application, determine the product to recommend among a plurality of products included in the product purchase history information based on the user profile, and transmit information for the product to recommend to the second server corresponding to the second application. At this time, the product to recommend may be a product not included in a second product purchase history information purchased through the second application.

For example, suppose that clothing is purchased in the first application installed in the smart apparatus 100, and clothing is not purchased in the second application.

The processor 180 may obtain clothing purchase history information purchased through the first application. The processor 180 may analyze information for clothing brands, materials and sizes, included in the purchase history. In addition, the processor 180 may determine the product to recommend among a plurality of products included in the clothing purchase history by reflecting the user profile. The communication interface 110 of the smart apparatus 100 may transmit clothing information to be recommended to the second server corresponding to the second application. At this time, the information for clothing is not included in purchase history of the second application.

Thereafter, though there is no purchase history for clothing from the second server corresponding to the second application, the communication interface 110 of the smart apparatus 100 may obtain recommend purchase information based on the user profile.

As described above, the plurality of applications are installed in the smart apparatus 100, and the selected information in the user profile is provided to each of the plurality of applications, through which the recommended product information reflecting the user profile may be obtained from the outer server although the user profile information possessing or providing different purchase histories as per each of the plurality of applications is different from each other. Alternatively, the processor 180 of the smart apparatus 100 may generate the recommended product information.

Figure 8:
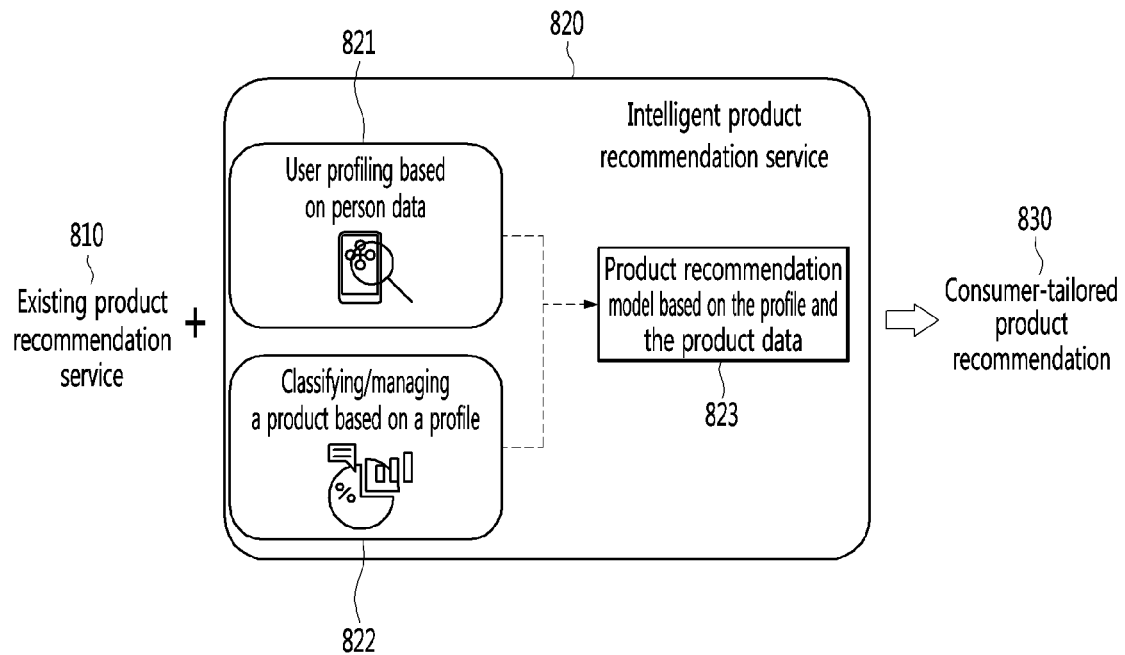
FIG. 8 is a view for explaining a process of generating recommended product information of the present disclosure.

FIG. 8 is a View for Explaining a Process of Generating Recommended Product Information of the Present Disclosure.

The process of FIG. 8 may be performed in the outer server receiving the user profile, and when the process is performed in the outer server, product information to recommend, which the smart apparatus 100 obtains, may be generated through the process of FIG. 8.

In addition, the process of FIG. 8 may be performed by the processor 180 of the smart apparatus 100 by using the user profile.

Referring to FIG. 8, the processor 180 of the smart apparatus 100 may generate the user profile by using the source data collected in the smart apparatus 100, and generate the product information to recommend based on the generated user profile.

According to the present disclosure, a conventional product recommendation service 810 may mean a recommendation algorithm.

The processor 180 may generate the user profile based on personal data (821) in order to provide an intelligent product recommendation service (820). In addition, the processor 180 may collect applications installed in the smart apparatus 100 or user activity information such as search histories and shopping information, and generate a product candidate group of interest to the user.

The processor 180 may classify the generated product candidate group to product candidates to recommend based on the user profile (822). After classifying the product candidates, the processor 180 may select the product to recommend using a product recommendation model (823) based the profile and the product data through the user profile, the product purchase history information and the like.

The processor 180 may determine, as the product to recommend, a customized product determined to be proper among the recommended products in the conventional recommendation algorithm 810 and the products to recommend, which are selected based on the user profile.

The processor 180 may generate the recommended product information based on the recommendation algorithm and the user profile, and may provide the generated recommended product information through an application, or transmit the same to the outer server or an outer server corresponding to the application.

The present disclosure exemplifies the user profile, but is not limited to the examples, and may include a variety of user profiles generated as user personal information that can be obtained from the smart apparatus 100.

Hereinafter, FIGS. 9 to 14 illustrate an example of obtaining information in the user profile.

Figure 9:
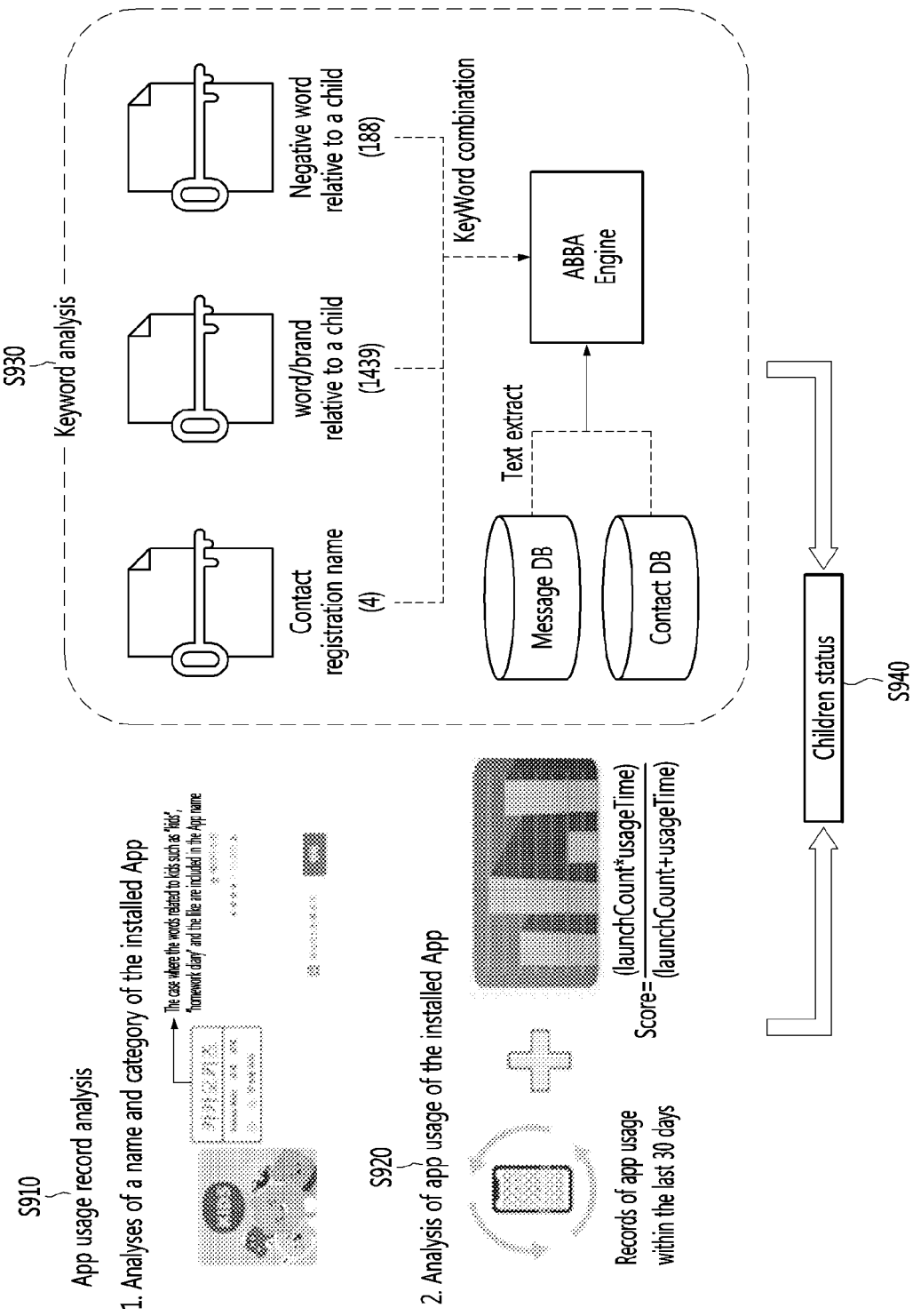
FIG. 9 illustrates an example of obtaining the user profile of the present disclosure.

FIG. 9 Illustrates an Example of Obtaining the User Profile of the Present Disclosure.

Referring to FIG. 9, a method for determining if a child is present in information included in the user profile is illustrated.

The processor 180 of the smart apparatus 100 may collect source data for determining if the user's child is present. At this time, the source data may include a usage record of an application installed in the smart apparatus 100 and a use time of an application installed in the smart apparatus 100. The processor 180 may acquire the usage record and the use time of the application (S910, S920). At this time, application information may include information for an application history that the user purchases or installs, and include information provided from the outer server.

The processor 180 may collect keyword information relative to the child as clustering information for determining if the child is present (S930). The keyword information may be provided from the outer server, and the processor 180 may internally generate the keyword information relative to the child.

When a keyword relative to the child is found by analyzing a name and a category of the installed application, the processor 180 may update the child's status (S940) of the user profile with "having a child".

For example, when a word such as "kids" is included in the name of the application, the processor 180 may determine that the user has a child.

In addition, the processor 180 may derive a score for determining if the child is present, by analyzing the user time of the application.

In addition, the processor 180 may determine if the child is present by determining if keywords relative to the child are included in a message, contact information or text information included in the smart apparatus 100 of the user, in combination with the keywords relative to the child.

In an embodiment of the present disclosure, the processor 180 may input the obtained source data in the ANN model in order to determine if the child of the user profile is present, and update the child's status outputted by the ANN model to the user profile. At this time, the source data for determining the child's status may include application information, the message information or the contact information, which is installed in the smart apparatus.

Figure 10:
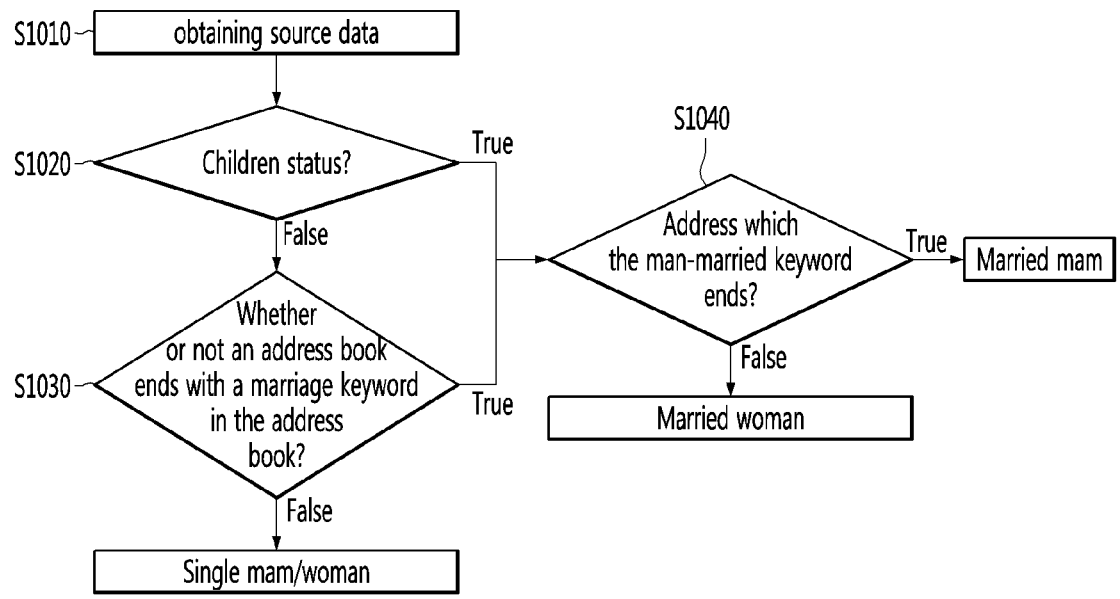
FIG. 10 illustrates an example of obtaining the user profile of the present disclosure.

FIG. 10 Illustrates an Example of Obtaining the User Profile of the Present Disclosure.

Referring to FIG. 10, a process of determining a marital status among the information included in the user profile is illustrated.

The processor 180 may obtain the source data in order to determine the marital status (S1010). The processor may firstly determine the child's status determined in FIG. 9 (S1020). When the child is determined not to be present, the processor 180 may extract a marriage-related keyword from the contact information of the user's smart apparatus, and determine if the marriage-related keyword is included therein (S1030).

When the contact information with the marriage-related keyword is not present, the processor 180 may determine that the user is a single man or a single woman.

When the child is determined to be present, in order to recognize the user's gender, the processor 180 may extract a keyword on men's marriage from the contact information of the smart apparatus 100, and determine if the keyword on men's marriage is included therein (S1040).

When the keyword on men's marriage is present, the processor 180 may determine that the user is a married man, and when the keyword on men's marriage is not present, the processor 180 may determine that the user is a married woman.

In addition, when the source data is changed according to the usage history of the smart apparatus 100 of the user, the processor 180 may update the user profile by analyzing the changed source data.

Figure 11:
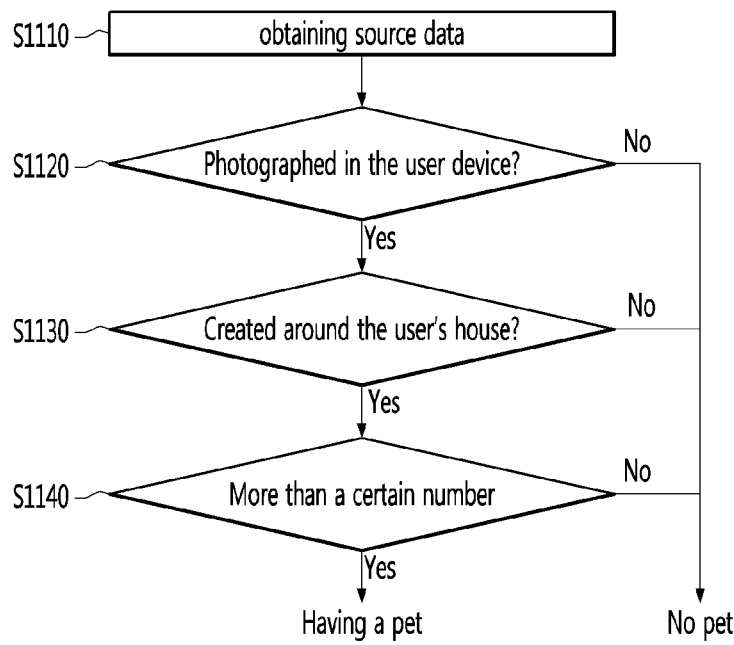
FIG. 11 illustrates an example of obtaining the user profile of the present disclosure.

FIG. 11 Illustrates an Example of Obtaining the User Profile of the Present Disclosure.

FIG. 11 illustrates a process for determining a presence of pets among the information included in the user profile.

The processor 180 of the smart apparatus 100 may obtain the source data for determining the presence of pets (S1110). At this time, the source data for determining the presence of pets may include an image or a video stored in the smart apparatus 100.

The processor 180 may obtain the image or the video stored in a gallery the smart apparatus 100, and select the image or the video including pets by using tag information in image or video information.

The processor 180 may obtain image creation time information, position information and animal information included in the tag information of the image or the video included in the pets. In addition, the processor 180 may determine if the image or the video was photographed in the smart apparatus of the user (S1120). When the image or the video is created by using the smart apparatus that the user possesses or other apparatuses, etc., the processor 180 may determine if the image or the video was created around the user's residential area by using the position information of the corresponding image or video (S1130).

For example, when the image or the video is created within a radius of 500 m around the user's residential area, the processor 180 may determine that the corresponding image or video is created in the user's house.

When the number of data that satisfies all of these conditions is more than a certain number, the processor 180 may determine that the user has a pet (S1140).

In addition, when the source data is changed according to the usage history of the smart apparatus 100 of the user, the processor 180 may update the user profile by analyzing the changed source data.

Figure 12:
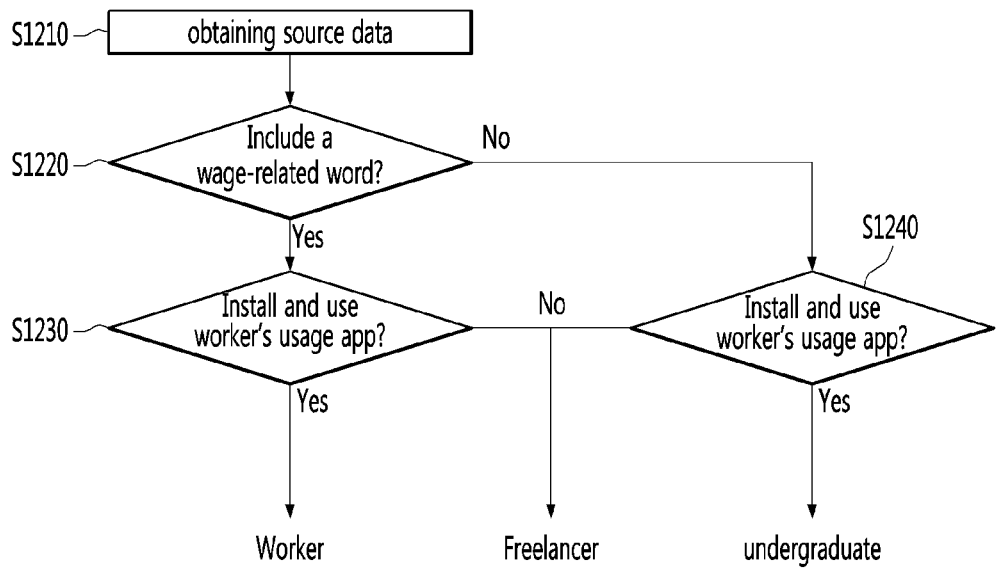
FIG. 12 illustrates an example of obtaining the user profile of the present disclosure.

FIG. 12 Illustrates an Example of Obtaining the User Profile of the Present Disclosure.

FIG. 12 illustrates the process for determining a work status among the information included in the user profile.

The processor 180 may obtain the source data for determining a work status (S1210). The source data may include contact information including a keyword that can estimate the user's identity, and text information such as a message.

The processor 180 may determine if wage-related words are included in the source data (S1220). The processor 180 may include the wage-related words, acquire application information installed in the smart apparatus 100, and determine if the acquire information is a worker-enabled application (S1230).

When the acquired information is the worker-enabled application, the processor 180 may classify the user as a workforce.

When the wage-related words are not included in the source data, the processor 180 may whether to install and use the worker-enabled application (S1240), and may classify the user as an undergraduate when the user uses the application. For example, the wage-related words are not displayed in the source data, but the processor 180 may classify the user installing applications related to job seekers or career paths as the undergraduate.

When the user is not included in the worker or the undergraduate, the processor 180 may classify the user as a freelancer.

In addition, when the source data is changed according to the usage history of the smart apparatus 100 of the user, the processor 180 may update the user profile by analyzing the changed source data.

Figure 13:
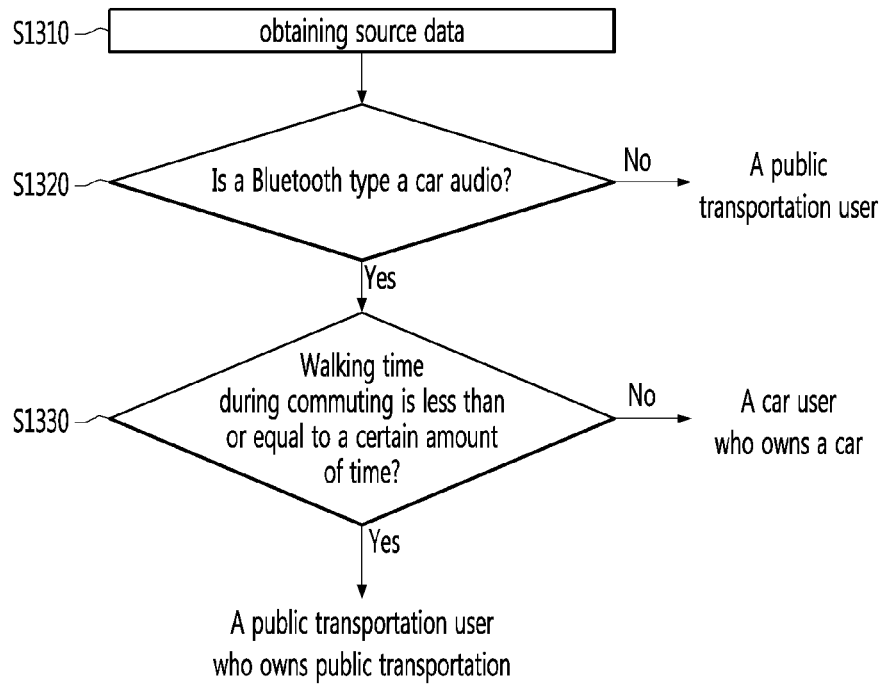
FIG. 13 illustrates an example of obtaining the user profile of the present disclosure.

FIG. 13 Illustrates an Example of Obtaining the User Profile of the Present Disclosure.

FIG. 13 is a process of determining a car status among the information included in the user profile.

The processor 180 may acquire the source data for determining the car status (S1310).

At this time, the source data for determining the car status may include database related to the user's Bluetooth use.

The processor 180 may acquire a usage record of Bluetooth connected in a certain period of time, which is information included in usage database of Bluetooth.

The processor 180 determines if there is data in which a type of a device to which Bluetooth included in the generated database is connected is a car audio (S1320). If there is no data satisfying the condition, transportation that the user uses the most is public transportation.

When there is data in which the type of the device connected by using Bluetooth is a car audio, the processor 180 may determine whether the user takes more than a certain amount of time to walk to and from work (S1330).

When the user takes more than a certain amount of time to walk to and from work, the processor 180 may determine that the user is a public transportation user who possesses the car. If the user does not take more than a certain amount of time, the processor may determine that the user is a car user who possesses the car. At this time, the time to walk to and from work may be acquired through AI techniques using the user's input, health-related applications or the source data.

In addition, when the source data is changed according to the usage history of the smart apparatus 100 of the user, the processor 180 may update the user profile by analyzing the changed source data.

Figure 14:
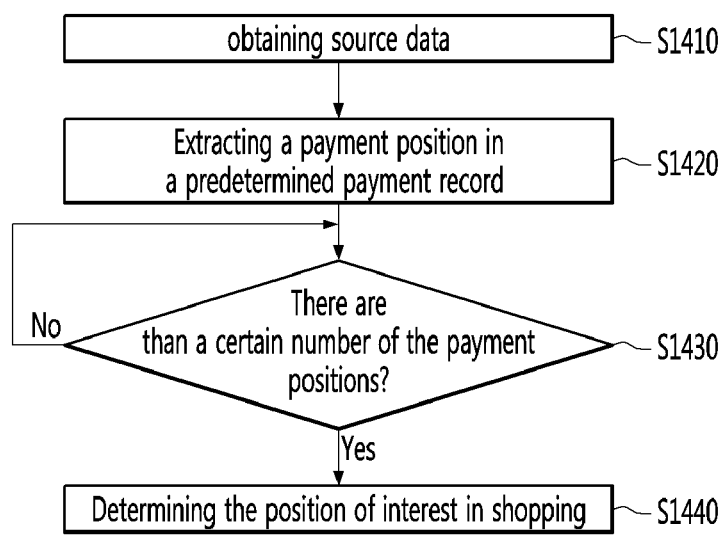
FIG. 14 illustrates an example of obtaining the user profile of the present disclosure.

FIG. 14 Illustrates an Example of Obtaining the User Profile of the Present Disclosure.

FIG. 14. illustrates information relative to a brand or mart that the user uses frequently among the information included in the user profile.

The processor 180 may acquire the source data included in the smart apparatus 100 to determine a place of interest (S1410). The acquire source data may include text information including shopping-related keywords. The processor 180 may classify a payment record among text data included in the source data, and extract a payment position in the payment record (S1420). The processor 180 may determine if the number of settlement positions acquired is more than a certain number with the same name (S1430).

For example, if there are more than 5 positions with the same name, a type or brand of a mart with the name may be determined as a type or brand of a mart that the user primarily uses, and the position of interest in shopping may be determined (S1440).

According to the present disclosure, the user profile is not limited to the above-described example, and may be variously generated based on the user person information.

In addition, when the source data is changed according to the usage history of the smart apparatus 100 of the user, the processor 180 may update the user profile by analyzing the changed source data.

Figure 16:
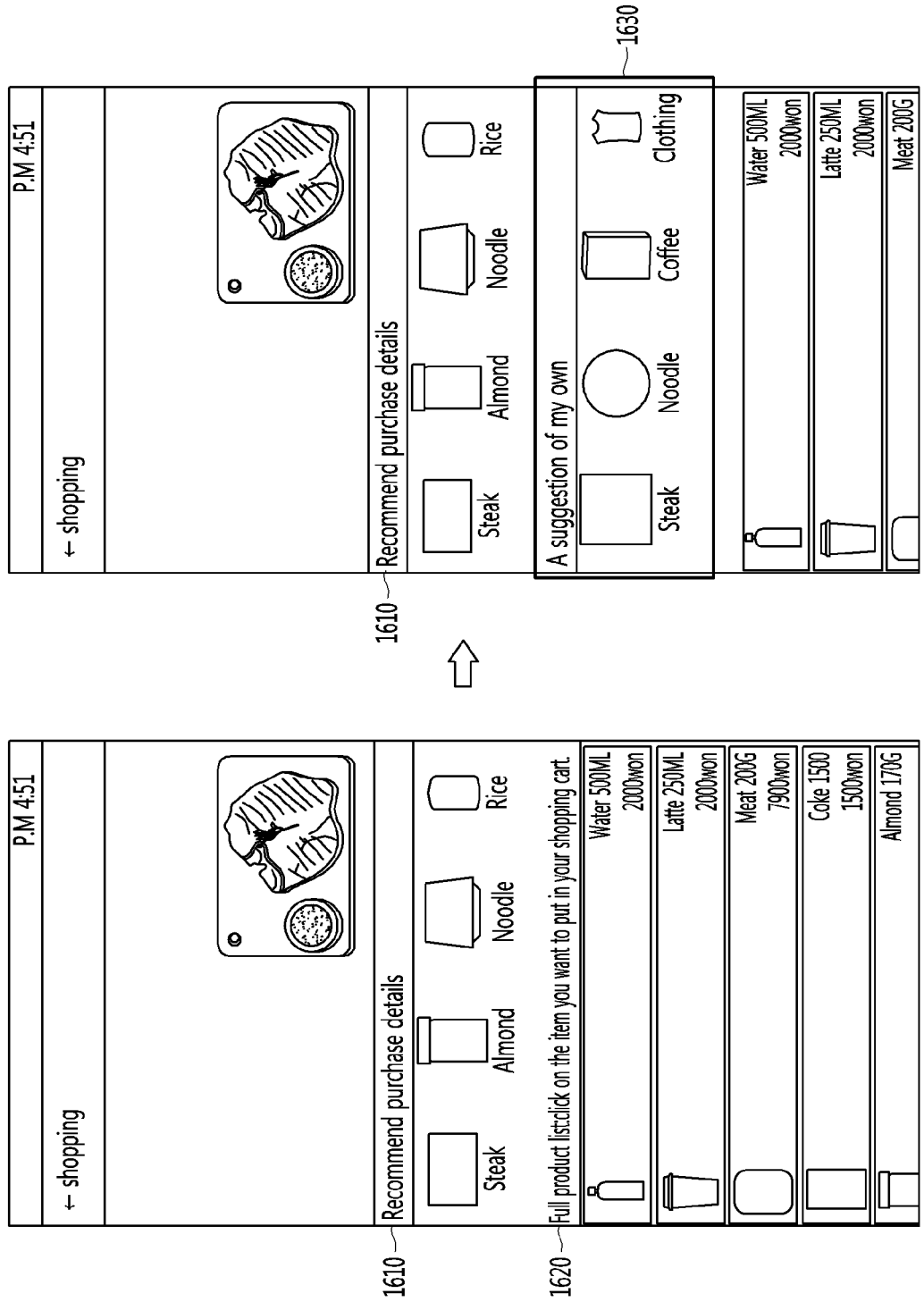
FIG. 16 is an output example of the present disclosure.

FIG. 15 and FIG. 16 are Output Examples of the Present Dis Closure.

FIG. 15 and FIG. 16 illustrate examples of product information to be recommended in an output interface 150 of the smart apparatus 100.

Basically, the processor 180 may receive information for the recommended product by using the user profile and the recommendation algorithm, from the outer server, and the output interface 150 may output information for the recommended product.

In addition, when the processor 180 individually provides the user profile according to information of the application installed in the smart apparatus 100, the processor 180 may receive the recommended product information from servers corresponding to each of a plurality of applications, and the output interface 150 may output the recommended product information received from the outer server.

At this time, by providing the user profile selected according to each of the outer servers, the recommended product information may be determined based on the selected user profile.

The smart apparatus 100 of the present disclosure may prevent a discharge of unnecessary person information, by acquiring information of the plurality of applications as described above and providing different user profiles as per each of the plurality of applications. In addition, an improved personal information management may be achieved by generating and managing a list in which the selected user profile is provided.

As another example, the smart apparatus 100 may receive a candidate group of the recommended product from the server, and the processor 180 may generate the recommended product information based on the recommendation algorithm and the user profile, and transmit the generated recommended product information to the outer server. Thereafter, the output interface 150 may output the recommended product information received from the outer server.

In the case above, a discharge to the outer server of the user profile is not achieved, the candidate group of the recommended product is received through the communication interface 110 of the smart apparatus 100, and the processor 180 of the smart apparatus 100 may select the customized product among the candidate group based on the recommended algorithm and the user profile, and transmit the selected product information to the outer server. Therefore, the outer server may acquire the recommended product information reflecting the user profile, and the smart apparatus may receive product information to newly recommend. The outer interface 150 may output information for the recommended product.

Referring to FIG. 15, if the application installed in the smart apparatus 100 is authorized to use the user profile, the user profile information selected according to the information application may be displayed on the top (1510).

For example, the user profile provided in the application illustrated in FIG. 15 includes a work status, a status of children, a presence of pets and a car status, and the user of the smart apparatus is a worker, but has the user profile that does not have the child, the pet and the car.

The user profile of 1510 above may be differently set through a touch input of the user and the like through the input interface 120 of the smart apparatus 100, and this may be utilized when the user profile information is not correctly generated or when another user uses the smart apparatus 100.

The output interface 150 may output a result in which the recommended product is analyzed, based on the recommendation algorithm and the selected user profile (1520).

Referring to FIG. 16, this figure illustrates an exemplified view of representing a case where the recommended product is changed before and after providing the user profile.

When using only the recommended algorithm, the smart apparatus 100 may generate and output the product information to recommended in purchase details as in 1610, and generate and output the recommended information to recommend in a full list of popular products as in 1620.

In addition, the product information to recommend may be received and outputted from the outer server.

In contrast, the product information to recommend, which is generated based on the user profile, may output "a suggestion of my own" tailored to the individual user as in 1630.

The disclosure may provide a user-customized product by using minimum personal information in a smart apparatus by recommending a customized recommendation of an individual user based on a user profile and a recommendation algorithm.

Flowcharts according to the present disclosure may be performed regardless of the order or concurrently. That is, they are not constrained in time-series order.

Other implementations are within the scope of the following claims.

The present disclosure can be made in software, firmware or a combination of software and firmware.

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

What is claimed is:

1. A smart apparatus, comprising:
   a memory;
   a communication interface configured to communicate with a server; and
   a processor configured to:
   obtain a source data collected by the smart apparatus;
   generate a user profile based on the obtained source data by inputting the source data to a trained neural network stored in the memory, wherein the neural network is trained to output the user profile based on source data input;
   determine whether an application installed on the smart apparatus is authorized to access the user profile when the server corresponding to the application requests the user profile through the communication interface;
   based on the application being authorized to access the user profile, obtain, from the application, information on an intended use of the user profile by the application;
   select at least a subset of profile information from the user profile specific to the intended use based on the information on the intended use by the application;
   generate and store in the memory a list including the application to correspond to the selected subset of profile information;
   transmit the subset of profile information to the server corresponding to the application through the communication interface;
   receive a recommended product information corresponding to the subset of profile information from the server; and
   output the recommended product information through an output interface,
   wherein the information on the intended use by the application includes a function information, a use information, and a category information of the application,
   wherein the subset of profile information selected for a first application is different from the subset of profile information selected for a second application based on at least one of the function, use, or category information of the first application being different from that of the second application.

2. The smart apparatus of claim 1,
wherein a plurality of applications are installed in the smart apparatus, and
authorization to use the user profile is differently assigned to each of the plurality of applications.

3. The smart apparatus of claim 2,
wherein the user profile includes at least one information of a status of children, a marital status, a presence of pets, a vehicle status, or a work status.

4. The smart apparatus of claim 1,
wherein
the source data includes application information installed in the smart apparatus, message information, and contact address information.

5. The smart apparatus of claim 1,
wherein the communication interface is configured to communicate with a first sever of the first application and a second server of the second application,
the processor is configured to: obtain product purchase history information purchased through the first application; determine a product to recommend among a plurality of products included in the product purchase history information based on the user profile; and transmit the product to recommend to the second server, and
the product to recommend is a product not included in a second product purchase history information purchased through the second application.

6. The smart apparatus of claim 1, wherein a candidate group of the recommended product is obtained from the server, and
the processor is configured to generate the recommended product information based on a recommendation algorithm and the user profile, and transmit the generated recommendation product information to the server.

7. A method for operating the smart apparatus communicating with at least one server, comprising:
obtaining a source data collected by the smart apparatus;
generating a user profile based on the obtained source data by inputting the source data into a trained neural network trained to output the user profile based on source data input;
determining whether an application installed on the smart apparatus is authorized to access the user profile when the server corresponding to the application requests the user profile;
based on the application being authorized to access the user profile, obtaining, from the application, information on an intended use of the user profile by the application;
selecting at least a subset of profile information from the user profile specific to the intended use based on the information on the intended use by the application;
generating and storing a list including the application to correspond to the selected subset of profile information;
transmitting the subset of profile information to the server corresponding to the application;
receiving a recommended product information corresponding to the subset of profile information from the server; and
outputting the recommended product information,
wherein the information on the intended use by the application includes a function information, a use information, and a category information of the application,
wherein the subset of profile information selected for a first application is different from the subset of profile information selected for a second application based on at least one of the function, use, or category information of the first application being different from that of the second application.

8. The method of claim 7, wherein the communicating with the server comprises communicating with a first server of the first application and a second server of the second application,
the method for operation the smart method further comprises:
receiving product purchase history information purchase through the first application;
determining a product to recommend among a plurality of products included in the product purchase history information based on the user profile; and
transmitting information for the product to recommend to the second server,
wherein the product to recommend is a product not included in a second product purchase history information purchased through the second application.

* * * * *